United States Patent [19]
Neal et al.

[11] Patent Number: 5,038,724
[45] Date of Patent: Aug. 13, 1991

[54] DEBRIS RESISTANT VALVE ASSEMBLY

[75] Inventors: Louis R. Neal, Zion; Dan E. Nelson, Wildwood, both of Ill.

[73] Assignee: Outboard Marine Corporation, Waukegan, Ill.

[21] Appl. No.: 509,978

[22] Filed: Apr. 16, 1990

[51] Int. Cl.⁵ .............................................. F01P 7/14
[52] U.S. Cl. ........................ 123/41.08; 137/512.2; 236/92 R; 440/88
[58] Field of Search ................ 137/512.2, 599.2; 251/356; 123/41.08, 41.13; 440/88; 236/92 R, 92 C

[56] References Cited

U.S. PATENT DOCUMENTS

| | | | |
|---|---|---|---|
| 3,017,113 | 1/1962 | Drapeau | 236/34 |
| 3,402,888 | 9/1968 | Kelly | 236/34 |
| 3,640,454 | 2/1972 | Freismuth et al. | 236/34 |
| 3,667,431 | 6/1972 | Kueny et al. | 123/41.08 |
| 4,457,727 | 7/1984 | Flaig | 440/88 |
| 4,669,988 | 6/1987 | Breckenfeld et al. | 440/88 |

FOREIGN PATENT DOCUMENTS

| | | | |
|---|---|---|---|
| 795914 | 3/1936 | France | 251/356 |
| 12461 | of 1904 | United Kingdom | 251/356 |

*Primary Examiner*—Noah P. Kamen
*Attorney, Agent, or Firm*—Michael, Best & Friedrich

[57] ABSTRACT

An internal combustion engine comprising an engine block defining a cylinder bore and a fluid jacket, an annular valve seat defining a first passageway communicating with the fluid jacket, a valve assembly including a housing having a fluid inlet, a fluid outlet, a second passageway communicating between the inlet and the outlet, a second valve seat located in said second passageway, and a partially spherical outer surface portion moveable into and out of seating engagement with the annular valve seat, a valve member in the housing, and a mechanism for moving the valve member into and out of seating engagement with the second valve seat for respectively closing and opening said second passageway, and a mechanism for biasing the partially spherical outer surface portion into seating engagement with the annular valve seat.

22 Claims, 2 Drawing Sheets

DEBRIS RESISTANT VALVE ASSEMBLY

BACKGROUND OF THE INVENTION

1. Field of the Invention

The invention relates to valve assemblies, and, more particularly, to relief valve assemblies for use in the cooling systems of internal combustion engines, and particularly marine engines.

2. Reference to Prior Art

Water cooled internal combustion engines include an engine block having a coolant conduit with an upstream portion and a downstream portion, and a valve assembly which controls cooling water flow from the upstream conduit portion to the downstream conduit portion to maintain a controlled engine temperature. The valve assembly controls engine temperature by permitting increased cooling water flow through the conduit as engine temperature or cooling water pressure increases, and decreased flow as engine temperature or water pressure decreases. The valve assembly can include a housing with an upstream inlet, a downstream outlet, and an opening between the inlet and the outlet. A thermostat in the housing is operable in response to upstream water temperature for opening and closing the opening and thereby permitting or preventing water flow through the housing. The housing is moveable into and out of engagement with a valve seat defining a second opening located between the upstream and downstream portions of the conduit to control water flow through the second opening in response to upstream coolant pressure, such as results from an increase in engine speed.

Attention is directed to the following U.S. Pat. Nos.:

| U.S. Pat. No. | Inventor | Issued |
| --- | --- | --- |
| 4,669,988 | Breckenfeld et al. | June 2, 1987 |
| 4,457,727 | Flaig | July 3, 1984 |
| 3,640,454 | Freismuth et al. | February 8, 1972 |
| 3,402,888 | Kelly | September 24, 1968 |
| 3,017,113 | Drapeau | January 16, 1962 |

SUMMARY OF THE INVENTION

The invention provides an internal combustion engine comprising an engine block defining a cylinder bore and a fluid jacket, an annular valve seat defining a first passageway communicating with the fluid jacket, a valve assembly including a housing having a fluid inlet, a fluid outlet, a second passageway communicating between the inlet and the outlet, a second valve seat located in said second passageway, and a partially spherical outer surface portion moveable into and out of seating engagement with the annular valve seat, a valve member, and means for moving the valve member into and out of seating engagement with the second valve seat for respectively closing and opening the second passageway, and means for biasing the partially spherical outer surface portion into seating engagement with the annular valve seat.

In one embodiment of the invention, the housing includes a substantially conical surface portion which has a longitudinal axis and which extends from the partially spherical outer surface portion upstream of the annular valve seat, and the inlet includes a plurality of substantially cylindrical passages each oriented transversely to the axis and each extending from the conical surface portion.

The invention also provides an internal combustion engine comprising an engine block defining a cylinder bore and a fluid jacket, a first valve seat defining a first passageway communicating with the fluid jacket, a first valve member having an outer surface which is movable into and out of seating engagement with the first valve seat and which converges to a point upstream of the first valve seat, and means for biasing the outer surface into seating engagement with the first valve seat.

The invention also provides a valve apparatus for use with an annular valve seat defining a first passageway, the valve apparatus comprising a housing including a fluid inlet, a fluid outlet, a second passageway communicating between the inlet and the outlet, a second valve seat located in said second passageway, and a partially spherical outer surface portion moveable into and out of seating engagement with the annular valve seat, a valve member, and means for moving the valve member into and out of seating engagement with the second valve seat for respectively closing and opening said second passageway.

The invention also provides a valve apparatus for use with a first valve seat defining a first passageway, the valve apparatus comprising a first valve member including an outer surface which is moveable into and out of seating engagement with the first valve seat and which converges to a point upstream of the first valve seat.

A principal feature of the invention is the provision of a valve assembly which controls the operating temperature of a water cooled internal combustion engine by controlling the rate of fluid flow through the engine, and which includes a housing that is configured to facilitate the flow of debris around the housing and that includes an inlet which restricts entry of debris into the housing.

Another principal feature of the invention is the provision of a valve assembly which controls the operating temperature of a water cooled internal combustion engine by controlling the rate of fluid flow through the engine, and which includes a housing having a surface that is configured to substantially seal with an annular valve seat even when the housing is misaligned on the seat.

Other features and advantages of the invention will become apparent to those skilled in the art upon review of the following detailed description, claims and drawings.

Figure 1:
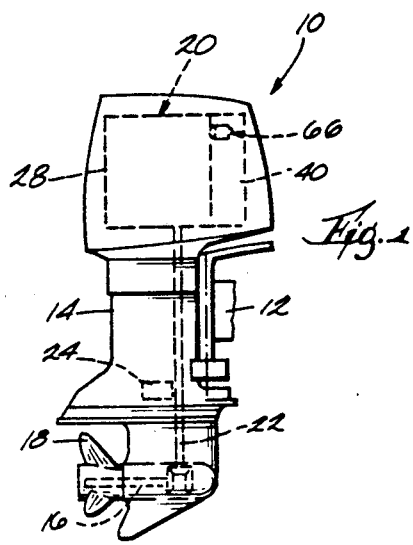
FIG. 1 is a side elevational, partially schematic view of a marine propulsion device embodying various of the features of the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

GENERAL DESCRIPTION

A marine propulsion device 10 embodying various features of the invention is illustrated in the drawings. As shown schematically in FIG. 1, the marine propulsion device 10 is preferably an outboard motor which is adapted to be supported on a boat 12 and which includes a lower unit 14 including a propeller shaft 16 that supports a propeller 18, a coolant or water cooled engine 20 drivingly connected to the propeller shaft 16 by a conventional drive train 22, and a conventional pump 24 for supplying cooling water to the engine 20.

The engine 20 is preferably identical to the engine disclosed in U.S. Ser. No. 509,609, filed Apr. 16, 1990, which is incorporated herein by reference.

Figure 2:
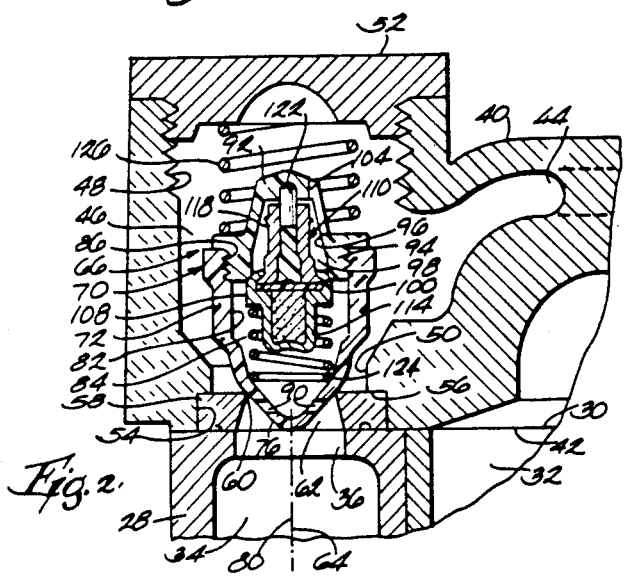
FIG. 2 is an enlarged view, partially in section, of the internal combustion engine showing the valve assembly housing in a closed position and the temperature responsive valve member in a closed position.

As shown in FIG. 2, the engine 20 includes an engine block assembly having an engine or cylinder block 28 which includes a cylinder head mounting surface 30 and which defines one or more cylinder bores 32 and an engine coolant or water jacket 34. The cylinder block 28 is provided with a suitable coolant or water inlet passage (not shown) communicating between the pump 24 and the engine water jacket 34 and is also provided with a coolant or water outlet passage 36 communicating between the engine water jacket 34 and the cylinder head mounting surface 30.

The engine 20 also includes a cylinder head 40 including a cylinder block mounting surface 42 which is engaged with the cylinder head mounting surface 30 of the cylinder block 28. In addition, the cylinder head 40 defines a cylinder head coolant or water jacket 44 including a chamber portion 46 having an access opening 48, a coolant or water inlet passage 50 which communicates between the chamber portion 46 and the cylinder block mounting surface 42 and which is preferably located in communicating alignment with the water outlet passage 36, and a coolant or water discharge passage (not shown). A removable plug member 52 is threaded into the access opening 48 to close the access opening 48.

The engine 20 also includes means for sealing the communication between the water outlet passage 36 and the water inlet passage 50 against leakage and for providing a valve seat. While other constructions can be employed, in the disclosed construction, such means comprises formation of the cylinder head 40 with a counter bore 54 which extends inwardly of the cylinder head 40 from the cylinder block mounting surface 42 in surrounding relation to the water inlet passage 50 and which includes a shoulder 56.

Located in the counter bore 54 and engaged between the shoulder 56 and the cylinder head mounting surface 30 of the cylinder block 28 is an annular seal member 58 which is preferably made of a resilient material such as rubber. The seal member 58 includes an annular first valve seat 60 having an annular wall which defines a first or central passageway 62 that communicates between the water outlet passage 36 and the water inlet passage 50. The central passageway 62 includes a longitudinal axis 64.

The engine 20 also includes a valve assembly 66 which is located in the chamber portion 46 of the cylinder head water jacket 44. The valve assembly 66 automatically controls water flow from the engine water jacket 34 to the cylinder head water jacket 44 to achieve desired engine operating temperatures. During engine operation the pump 24 takes water surrounding the lower end of the lower unit 14 and pumps it through engine water jacket 34 and cylinder head water jacket 44 to cool the engine 20. The water provided by the pump 24 can contain debris which is pumped along with the water through the water jackets 34 and 44. A coarse meshed screen (not shown) can be provided to prevent the entry of relatively large pieces of debris into the lower unit 14. Although relatively finer meshed screens could be used to further reduce debris entry into the lower unit 14, the finer screen unduly restricts fluid flow when the engine is operating at high speeds and requires a greater coolant flow rate through the water jackets 34 and 44.

Accordingly, the valve assembly 66 is configured to minimize the possibility of debris clogging the valve assembly 66 or otherwise interfering with valve assembly performance. In addition, if the valve assembly 66 should become clogged, the valve assembly 66 is easily accessed for repair or replacement by removing the plug member 52.

Figure 6:
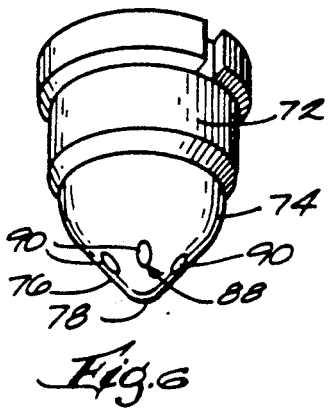
FIG. 6 is a perspective view of a portion of the valve assembly housing shown in FIGS. 2 through 5.

In the illustrated arrangement and as shown most clearly in FIG. 2, the valve assembly 66 includes a housing 70 which has an upstream housing section 72. The upstream housing section 72 includes an outer surface having a partially spherical surface portion 74 (FIGS. 3 and 6) which is moveable into and out of engagement with the annular valve seat 60 to at least partially control coolant flow from the engine water jacket 34 to the cylinder head water jacket 44. The outer surface of the housing section 72 also has a surface portion 76 extending upstream from the partially spherical surface portion 74 and converging to a point 78 upstream of the annular valve seat 60. While the surface portion 76 may have various configurations and while the point 78 can be sharp, in the illustrated arrangement, the surface portion 76 is substantially conical and converges to a rounded point 78. The conical surface portion 76 includes a longitudinal axis 80 preferably coincident with the longitudinal axis 64 of the central passageway 62.

The upstream housing section 72 also includes an inner surface 82 defining an upstream passageway 84 and including a threaded portion 86 defining an opening in the top of the upstream housing section 72. The upstream housing section 72 further includes a fluid inlet 88 communicating between the engine water jacket 34 and the upstream passageway 84. As seen most clearly in FIGS. 6 and 7, the fluid inlet 88 preferably includes a plurality of small cylindrical passages 90 oriented transversely, and preferably perpendicularly, to the longitudinal axis 80 of the conical surface portion 76. Each of the cylindrical passages extends between the conical surface portion 76 and the upstream passageway 84. In the illustrated arrangement, the diameter of each cylindrical passage 90 is not greater than approximately 0.1 inch.

As shown in FIG. 2, the valve assembly housing 70 also includes a downstream housing section 92 including a male portion 94 threaded into the opening defined by the threaded portion 86 of the upstream housing section 72, or otherwise assembled to the upstream housing section 72. The downstream housing section 92 also includes an inner surface 96 which defines a downstream passageway 98 and which has a portion forming a second valve seat 100 located between the upstream passageway 84 and the downstream passageway 98. The downstream housing section 92 further includes a fluid outlet 104 communicating between the cylinder head water jacket 44 and the downstream passageway 98. The upstream passageway 84 and the downstream passageway 98 define a passageway which communicates between the fluid inlet 88 and the fluid outlet 104 and in which the second valve seat 100 is located.

Figure 4:
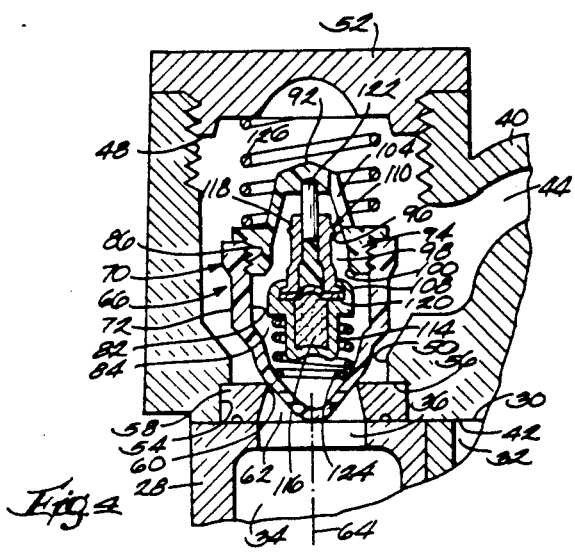
FIG. 4 is a view similar to FIG. 2, and showing the temperature responsive valve member in an open position in response to increased water temperature.

As illustrated in FIGS. 2 and 4, the valve assembly 66 also includes a valve member 108 and means 110 located in the valve assembly housing 70 for moving the valve member 108 into and out of engagement with the second valve seat 100 to respectively prevent and permit communication between the upstream passageway 84 and the downstream passageway 98, to thereby control fluid flow through the valve assembly housing 70. While various means 110 can be employed, in the illustrated arrangement, the means 110 includes a commercially available, thermally operable thermostat unit including a container portion 114 having therein a thermally responsive expandable-contractable material 116 (FIG. 4), an extension portion 118, a membrane 120 (FIG. 4), and a piston 122 which is slideably received in the extension portion 118 and which has an upper end bearing against the downstream housing section 92 and a lower end bearing against the membrane 120. The piston 122 is moveable relative to the extension portion 118 in response to expansion of the thermally responsive material 116 to move the valve member 108 out of engagement with the second valve seat 100 (FIG. 4). The means 110 also includes means for biasing the valve member 108 toward the second valve seat 100. This means preferably includes a helical spring 124 extending between the upstream housing section 72 and the valve member 108.

The engine 20 also includes means for biasing the valve assembly housing 70, and in particular the partially spherical surface portion 74, into seating engagement with the annular valve seat 60 to close the central passageway 62. While various means for biasing can be employed, in the illustrated arrangement, the means for biasing includes a second helical spring 126 which is located between the plug member 52 and the downstream housing section 92 of the valve assembly housing 70.

Figure 5:
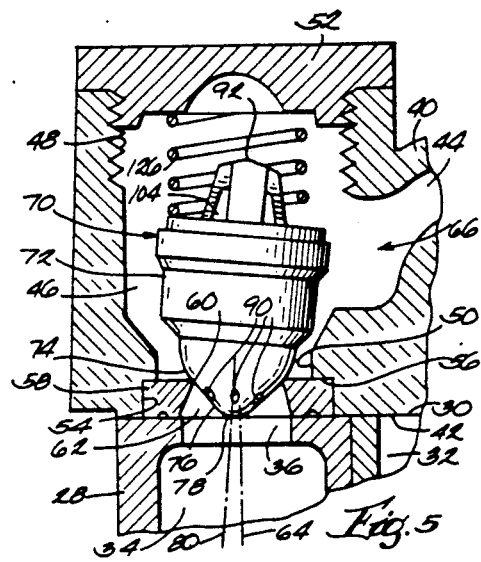
FIG. 5 is an enlarged view similar to FIG. 2, and showing the valve assembly housing in a misaligned position.

As shown in FIG. 2, when the engine 20 is at idle or low speeds, spring 124 holds the valve member 108 against the second valve seat 100 to prevent water flow from the upstream passageway 84 to the downstream passageway 98, and the spring 126 holds the partially spherical surface portion 74 against the annular valve seat 60 to close the central passageway 62. As shown in FIG. 5, the partially spherical surface portion 74 is seated on the annular valve seat 60 so as to substantially seal or close the central passageway 62, even when the valve assembly housing 70 is misaligned, i.e., when the longitudinal axis 64 of the central passageway 62 and the longitudinal axis 80 of the conical surface portion 76 do not coincide.

Figure 7:
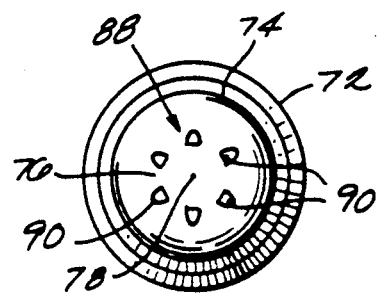
FIG. 7 is a bottom view of the housing portion shown in FIG. 6.

Increased engine temperature causes expansion of the material 116 which in turn moves the valve member 108 downwardly off the second valve seat 100 to permit water flow from the upstream passageway 84 to the downstream passageway 98 (FIG. 4). As shown in FIG. 7, the cylindrical passageways 90 in the upstream housing section 72 restrict the entry of larger pieces of debris into the upstream passageway 84. The transverse orientation of the cylindrical passageways 90 relative to the longitudinal axis 80 of the conical surface portion 76 further restricts the entry of small pieces of debris into the upstream passageway 84 since the debris must generally travel transversely to the direction of water flow through the central passageway 62 to enter the upstream passageway 84. Reduction of the size and the frequency of debris entry into the upstream passageway 84 reduces the possibility that a piece of debris will become lodged between the valve member 108 and the second valve seat 100 or otherwise clog the interior of the valve assembly 66.

Figure 3:
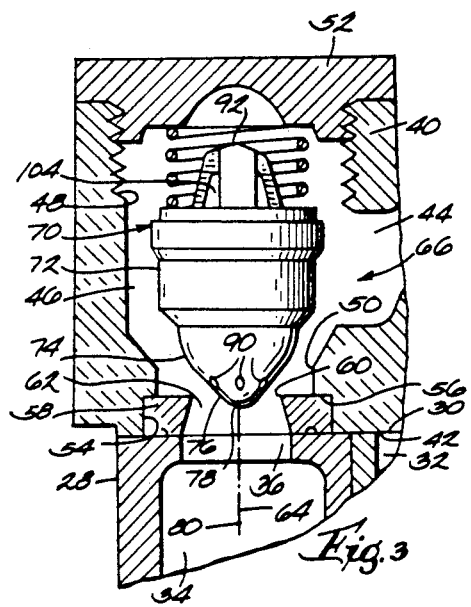
FIG. 3 is an enlarged view similar to FIG. 2, and showing the valve assembly housing in an open position in response to increased upstream water pressure.

As shown in FIG. 3, when the water pressure increases in the engine water jacket 34 due to increased engine speeds, the valve assembly housing 70, including the partially spherical surface portion 74, moves against the spring 126 and out of seating engagement with the annular valve seat 60 to thereby open the central passageway 62 and provide communication between the water jackets 34 and 44. The partially spherical surface portion 74 and the conical surface portion 76 cooperate to facilitate the flow of debris around the upstream housing section 72 and past the annular valve seat 60, thereby reducing the possibility that debris will clog the central passageway 62 or become lodged between the partially spherical surface portion 74 and the annular valve seat 60.

Various features of the invention are set forth in the following claims.

We claim:

1. An internal combustion engine comprising an engine structure defining a cylinder bore, a fluid jacket, and an annular valve seat defining a first passageway communicating with said fluid jacket, a valve assembly including a housing having a fluid inlet, a fluid outlet, a second passageway communicating between said inlet and said outlet, a second valve seat located in said second passageway, a partially spherical outer surface portion moveable into and out of seating engagement with said annular valve seat, a conical surface portion extending from said partially spherical outer surface portion, extending upstream of said annular valve seat and having an axis, and a passage which is oriented transversely to said axis, which extends from said conical surface portion, and which constituted said fluid inlet, a valve member, and means for moving said valve member into and out of seating engagement with said second valve seat for respectively closing and opening said second passageway, and means for biasing said partially spherical outer surface portion into seating engagement with said annular valve seat.

2. An internal combustion engine as set forth in claim 1, wherein said inlet includes a plurality of said passages.

3. An internal combustion engine as set forth in claim 2, wherein each of said passages is cylindrical.

4. An internal combustion engine as set forth in claim 5, wherein said first passageway includes an longitudinal axis coincident with said axis of said conical surface.

5. An internal combustion as set forth in claim 1, wherein said means for biasing includes a spring extending between said engine structure and said housing.

6. An internal combustion engine as set forth in claim 5, wherein said means for moving said valve member is thermally responsive.

7. An internal combustion engine comprising an engine structure defining a cylinder bore, a fluid jacket, and a first valve seat defining a first passageway communicating with said fluid jacket, a first valve member including a fluid inlet, a fluid outlet, a second passageway communicating between said inlet and said outlet, a second valve seat located in said second passageway, an outer surface which is movable into and out of seating engagement with said first valve seat, and which includes a conical surface portion including an axis and converging to a point upstream of said first valve seat, and a passage which is oriented transversely to said axis, which extends from said conical surface portion, and which constitute said fluid inlet, means for biasing said outer surface into seating engagement with said first valve seat, a second valve member, and means for moving said second valve member into and out of engagement with said second valve seat for respectively closing and opening said second passageway.

8. An internal combustion engine as set forth in claim 7, wherein said inlet includes a plurality of said passages.

9. An internal combustion engine as set forth in claim 8, wherein each of said passages is cylindrical.

10. An internal combustion engine as set forth in claim 7, wherein said means for biasing includes a spring extending between said engine structure and said housing.

11. An internal combustion engine as set forth in claim 10, wherein said means for moving said second valve member is thermally responsive.

12. A valve apparatus for use with an annular valve seat defining a first passageway, said valve apparatus comprising a housing including a fluid inlet, a fluid outlet, a second passageway communicating between said inlet and said outlet, a second valve seat located in said second passageway, a partially spherical outer surface portion moveable into and out of seating engagement with said annular valve seat, a conical outer surface portion extending from said partially spherical outer surface portion and upstream of said annular valve seat and having an axis, and a passage which is oriented transversely to said axis, which extends from said conical surface portion, and which constitutes said fluid inlet, a valve member, and means for moving said valve member into and out of seating engagement with said second valve seat for respectively closing and opening said second passageway.

13. A valve apparatus as set forth in claim 12, wherein said inlet includes a plurality of said passages.

14. A valve apparatus as set forth in claim 13, wherein each of said passages is cylindrical.

15. A valve apparatus as set forth in claim 14, wherein said first passageway includes an longitudinal axis coincident with said axis of said conical surface portion.

16. A valve apparatus as set forth in claim 12, wherein said valve apparatus further comprises means engaging said housing for biasing said partially spherical surface portion into seating engagement with said annular valve seat.

17. A valve apparatus as set forth in claim 16, wherein said means for moving said valve member is thermally responsive.

18. A valve apparatus for use with a first valve seat defining a first passageway, said valve apparatus comprising a first valve member including a fluid inlet, a fluid outlet, a second passageway communicating between said inlet and said outlet, a second valve seat located in said second passageway, an outer surface which is moveable into and out of seating engagement with the first valve seat, and which includes a conical surface portion having an axis and converging to a point upstream of the first valve seat, and a passage which is oriented transversely to said axis, which extends from said conical surface portion, and which constitute said fluid inlet, a second valve member, and means for moving said second valve member into and out of engagement with said second valve seat for respectively closing and opening said second passageway.

19. A valve apparatus as set forth in claim 18, wherein said inlet includes a plurality of said passages.

20. A valve apparatus as set forth in claim 19, wherein each of said passages is cylindrical.

21. A valve apparatus as set forth in claim 20, wherein said valve apparatus further comprises means engaging said first valve member for biasing said outer surface into seating engagement with said first valve seat.

22. A valve apparatus as set forth in claim 21, wherein said means for moving said second valve member is thermally responsive.

* * * * *